United States Patent Office 3,042,680
Patented July 3, 1962

---

3,042,680
ω-DI(PYRIDYL)-ALKANE DERIVATIVES OF
1-ARYL-2-AMINO-ALKANES
Kurt Thiele, Frankfurt am Main, Germany, assignor to Deutsche Gold- und Silber-Scheideanstalt vormals Roessler, Frankfurt am Main, Germany
No Drawing. Filed Nov. 13, 1961, Ser. No. 152,009
Claims priority, application Germany Nov. 18, 1960
3 Claims. (Cl. 260—296)

The present invention relates to novel compounds of the formula

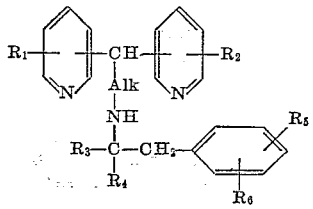

and their salts. In such formula: $R_1$ and $R_2$ signify hydrogen or the same or different lower alkyl groups, Alk signifies an alkylene radical containing 2 to 4 carbon atoms of which 1 or 2 carbon atoms form the bridge between the CH group and the NH group, $R_3$ and $R_4$ signify hydrogen or the same or different lower alkyl groups, $R_5$ and $R_6$ signify hydrogen or the same or different halogen atoms, such as chlorine or bromine, hydroxy groups or lower alkoxy groups, such as methoxy and ethoxy. These compounds possess valuable pharmaceutical properties and particularly have a stimulating action on the central nervous system and a coronary dilating action.

The compounds according to the invention can be produced by reacting a dipyridyl methane of the formula

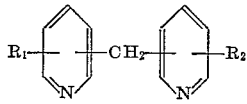

with a compound of the formula

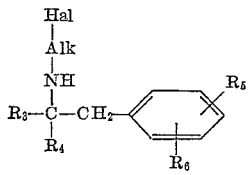

in the presence of an alkaline condensing agent.

The compounds according to the invention can also be prepared by reductively condensing a compound of the formula

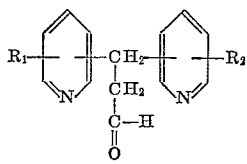

with a compound of the formula

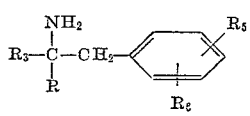

Furthermore the compounds can be prepared by reducing a compound of the formula

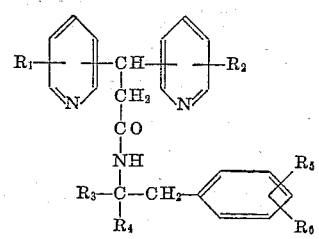

for example, with lithium aluminum hydride.

The following examples will serve to illustrate several embodiments of the invention.

Example 1

40.8 g. of di-(2-pyridyl)-methane were diluted with 180 cc. of benzene and 20.3 g. of a 50% sodamide in benzene suspension added thereto. The mixture was then boiled under reflux for 4 hours. Thereafter, 36 g. of 1-phenyl-2-ω-bromo-ethylamino propane dissolved in 180 cc. of benzene were added dropwise and the mixture again refluxed for 4 hours. The reaction mixture was decomposed with water while cooling with ice, the benzene layer separated off and the aqueous layer extracted with chloroform. The solvent layers were combined and after the solvents were distilled off the residue was fractionated under vacuum. After the excess di-(2-pyridyl)-methane had distilled over as first runnings, 24 g. of N-(3'-phenyl - propyl-(2))-1,1-di-(2 - pyridyl)-propyl-(3)-amine of the formula

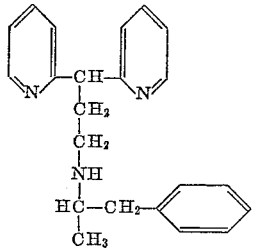

distilled at 210–228° C. under a pressure of 1.5 mm. Hg. This base solidified upon being rubbed to form crystals having a melting point of 69–70° C. The free base was converted into the hydrochloride with HCl dissolved in isopropanol. For purification the salt was dissolved in acetone and recrystallized by addition of ether. The resulting crystals had a melting point of 130–131° C.

Example 2

86 g. of α-pyridyl-α-picolyl-(2')-methane were dissolved in 375 cc. of benzene and refluxed with 39 g. of a 50% sodamide solution in benzene for 4 hours. Thereafter, 75 g. of 1-phenyl-2-ω-bromo-ethylamino propane dissolved in 375 cc. of benzene were added and the mixture refluxed for another 4 hours. Water was then added to the reaction mixture while cooling and the benzene layer separated off. The aqueous layer was extracted with benzene and the combined benzene layers dried and processed as in Example 1. After a first running of excess α-pyridyl-α-picolyl-(2')-methane 47 g. of N-(3')-phenyl - propyl-(2'))-1-(2-pyridyl)-1-(6-methyl- 2-pyridyl)-propyl-(3)-amine of the formula

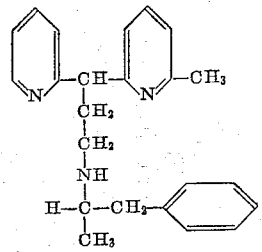

distilled over at 204–208° C. under a pressure of 0.05 mm. Hg. The monohydrochloride of the free base had a melting point of 146–147° C.

*Example 3*

In a way similar to Example 1 the compound N-(3'-p-chloro - phenyl - propyl - (2'))-1,1-di-(2-pyridyl)-propyl(3)-amine was prepared. The compound is an oil with a boiling point of 201 to 210° C. at a pressure of 0.5 mm. Hg.

I claim:
1. A compound of the formula

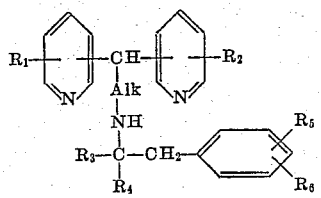

wherein Alk is alkylene of 2 to 4 carbon atoms of which 1 to 2 carbon atoms form the bridge between the CH and NH groups connected thereby, each of $R_1$, $R_2$, $R_3$ and $R_4$ are selected from the group consisting of hydrogen and lower alkyl and each of $R_5$ and $R_6$ are selected from the group consisting of hydrogen, lower alkyl, halogen, hydroxyl and lower alkoxy.

2. A compound of the formula

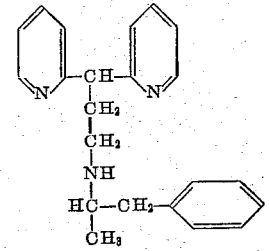

3. A compound of the formula

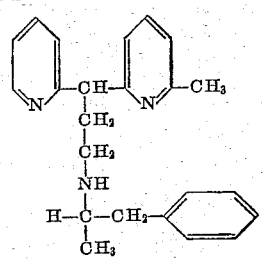

No references cited.